March 10, 1959 P. R. J. COURT 2,877,300

TELEVISION RECEIVER

Filed Aug. 18, 1954

INVENTOR.
Patrick R. J. Court
BY
Mason, Kolehmainen, Rathburn & Wyss
Att'ys

United States Patent Office 2,877,300

Patented Mar. 10, 1959

2,877,300

TELEVISION RECEIVER

Patrick R. J. Court, Buffalo, N. Y., assignor to Sylvania Electric Products, Inc., a corporation of Massachusetts Application August 18, 1954, Serial No. 450,697

9 Claims. (Cl. 178—7.5)

The present invention relates to television receivers, more particularly to the horizontal scanning and the high voltage portions of a television receiver and the invention has for an object the provision of a new and improved horizontal scanning system which may be economically operated from a relatively low voltage plate supply while providing substantially increased high voltage and scanning current for the picture tube.

In present day television receivers it is customary to obtain the accelerating anode voltage for the picture tube from the horizontal scanning power output tube by means of a so-called inductive kick arrangement wherein the large amplitude voltage pulses produced across the horizontal output transformer during retrace periods are peak rectified to provide the desired high voltage. If the power output tube is not rendered completely non-conductive during retrace periods it places a load on the output transformer so that the amplitude of the voltage pulses produced thereacross is substantially reduced with the result that the high voltage is reduced and a relatively dim picture is obtained. In order to render the horizontal power output tube non-conductive during retrace periods, a so-called "peaking" arrangement is normally provided wherein a pulse component is added to the saw-tooth scanning wave by means of a resistor inserted in series with the sweep charging condenser. However, many types of horizontal output tubes require a relatively large negative grid voltage to render the tube completely non-conductive when a relatively large amplitude pulse is impressed upon the anode thereof and with the relatively low voltage plate supply now employed in many receivers it is very difficult to obtain the necessary saw-tooth scanning wave form plus the necessary peaking voltage to insure that the output tube is completely cut off during the retrace periods. Since the saw-tooth scanning wave is essential to the operation of the system, many receivers simply do not provide an adequate amplitude of peaking voltage with the result that the optimum high voltage for the picture tube is not realized.

It is, therefore, another object of the present invention to provide a new and improved horizontal scanning system for a television receiver wherein facilities are provided for rendering the horizontal output tube completely non-conductive during retrace periods while operating from a relatively low voltage plate supply.

It is a further object of the present invention to provide a new and improved horizontal scanning system for television receivers wherein substantially increased high voltage for the picture tube is provided without increasing the cost or complexity of the scanning circuitry.

It is a still further object of the present invention to provide a new and improved horizontal scanning system for a television receiver wherein common facilities are provided for maintaining the scanning oscillator in synchronism with the received television signal and substantially increasing the high voltage available for the accelerating anode of the picture tube.

It is another object of the present invention to provide a new and improved horizontal scanning system for a television receiver which may be operated from a low voltage plate supply while providing a substantially larger amplitude of scanning current and a relatively large accelerating anode voltage for the picture tube.

Briefly, in accordance with one phase of the invention, the horizontal output transformer of the television receiver is provided with an auxiliary winding of relatively few turns, which is connected in the cathode circuit of the horizontal output tube so that positive pulses are impressed upon the cathode of the output tube during the retrace intervals of the saw-tooth horizontal scanning wave which is impressed on the control grid of the horizontal output tube from the horizontal scanning oscillator. With this arrangement the scanning oscillator is not required to develop any peaking voltage while, at the same time, providing an arrangement whereby the horizontal output tube is completely cut off for substantially the entire duration of the retrace intervals, so that a substantial increase in the high voltage which may be derived from the horizontal output tube is achieved. In accordance with a further aspect of the invention, the auxiliary winding is also employed as a source of pulses for the automatic frequency control circuit of the television receiver which functions to maintain the horizontal scanning oscillator in synchronism with the received television signal.

By impressing positive pulses on the cathode of the horizontal output tube during the retrace intervals the average cathode voltage during trace intervals is increased negatively so that the effective plate supply voltage for the horizontal output tube is increased with the result that an increased amplitude of scanning current is also obtained. This larger current flowing through the output transformer also produces larger amplitude voltage pulses thereacross during retrace intervals which result in an increased accelerating anode voltage for the picture tube.

The invention, both as to its organization and method of operation, together with further objects and advantages thereof, will best be understood by reference to the following specification taken in connection with the accompanying drawings, in which.

Figures 1, 2, 3, 4, 5:
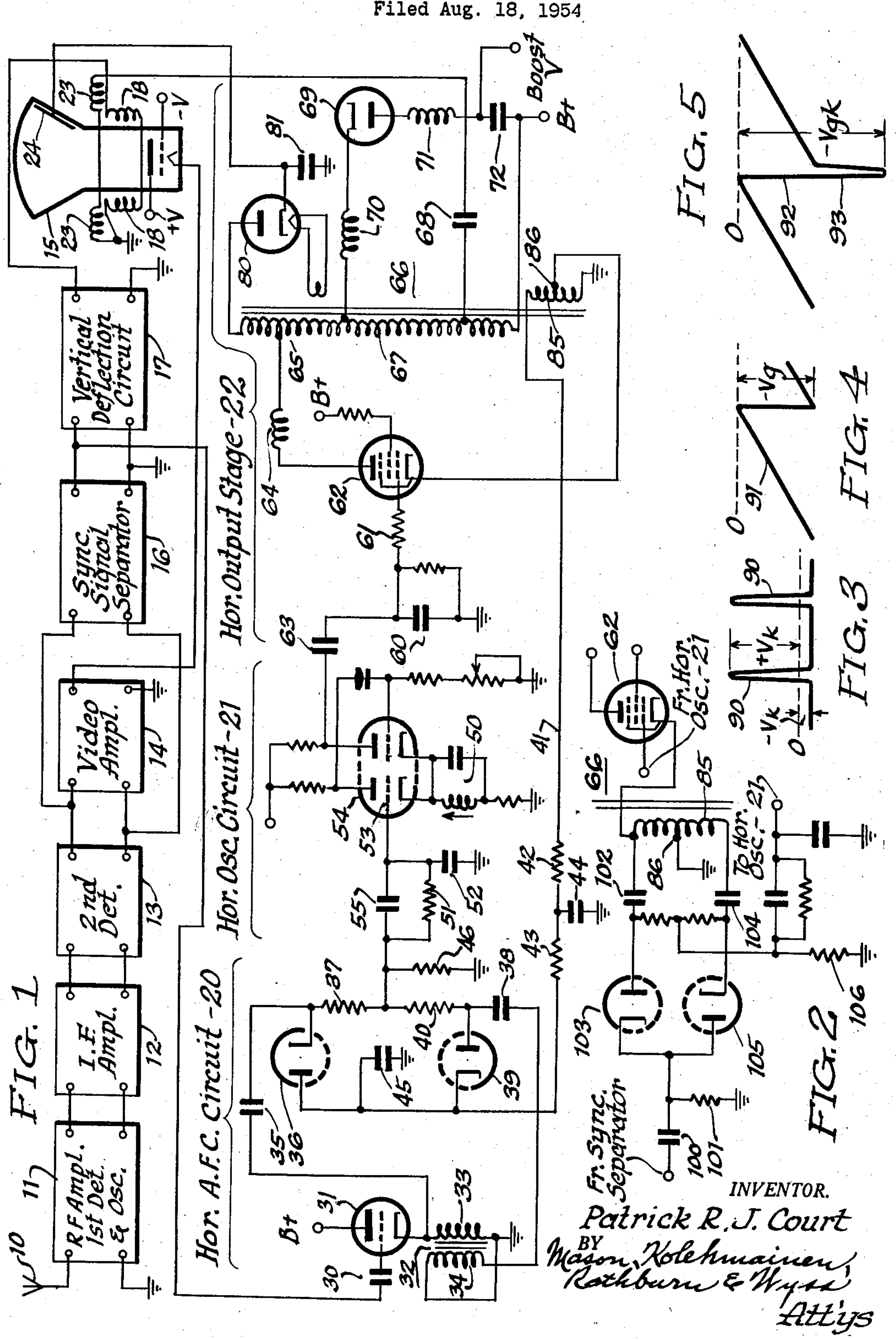
Fig. 1 is a schematic diagram, partly in block diagram form of a television receiver embodying the present invention.
Fig. 2 is a schematic diagram illustrating an alternative embodiment of the present invention.
Figs. 3, 4 and 5 are timing diagrams of some of the waveforms developed in the circuit of Fig. 1.

Referring now to the drawings and more particularly to Fig. 1 thereof, the system therein illustrated comprises a modulated carrier wave television receiver of the superheterodyne type including an antenna system 10, connected to an R. F. amplifier, first detector and oscillator 11, to which are connected in cascade relation in the order named, an intermediate frequency amplifier 12, a second detector 13, a video amplifier 14 and a cathode ray tube viewing device 15. The detected modulation components from the second detector 13 are coupled to a synchronizing signal separator circuit 16 wherein the horizontal and vertical synchronizing pulses are separated from the composite television signal, the vertical synchronizing pulses being connected to a vertical deflection circuit 17 so as to develop a suitable vertical scanning current in the vertical deflection coils 18 which surround the neck of the cathode ray tube 15. The horizontal synchronizing pulses from the separator 16 are impressed upon a horizontal automatic frequency control circuit 20 which is arranged to control the frequency of a horizontal oscillator 21, the oscillator 21 driving a horizontal output stage 22 which develops a suitable horizontal scanning current for the horizontal scanning coils 23 and also develops a suitable accelerating anode voltage for the accelerating anode 24 of the picture tube 15. The circuit components 10 to 17, inclusive, may all be of conventional well known construction so that a detailed description thereof is considered unnecessary herein. In this connection it will be understood that a suitable sound channel is provided for reproducing the sound signal accompanying the received television signal.

Referring now more particularly to the circuits 20, 21 and 22 wherein facilities embodying the features of the present invention are provided, the horizontal AFC circuit 20 comprises a balanced discriminator arrangement to which synchronizing pulses are supplied from a phase inverter arrangement. More particularly, synchronizing pulses from the signal separator 16 are coupled through the condenser 30 to the control grid of the phase inverter tube 31 in the cathode circuit of which is provided a pulse transformer 32 provided with a first winding 33 across which positive synchronizing pulses are developed and a second winding 34 across which negative synchronizing pulses are developed. Positive pulses developed across the winding 33 are coupled through the condenser 35 to the cathode of the rectifier 36 and to a load resistor 37. The negative pulses developed across the winding 34 are coupled through the condenser 38 to the anode of another rectifier 39 and to the load resistor 40.

In order to produce a control voltage proportional to the phase relationship between the synchronizing pulses and the scanning waveform developed by the horizontal oscillator 21, pulses are produced by the horizontal output stage 22 during the retrace intervals of the horizontal scanning wave, as will be described in more detail hereinafter, and these pulses are impressed upon the conductor 41 and are integrated in the integration network including the series resistors 42 and 43 and the shunt condensers 44 and 45 so that a saw-tooth voltage is impressed across the rectifiers 36 and 39. As a result, a variable voltage is produced across the output resistor 46 of the AFC circuit 20 and this voltage is coupled to the horizontal oscillator 21. The horizontal oscillator 21 comprises a multivibrator of the cathode coupled type wherein a tuned circuit 50 is provided in the common cathode circuit so that the multivibrator normally tends to run at approximately the horizontal scanning rate and the control voltage developed across the resistor 46 is integrated in the network including the series resistor 51 and the shunt condenser 52 so that a substantially unidirectional control voltage is supplied to the control grid 53 of the double triode tube 54, a condenser 55 being employed for anti-hunt purposes. The right hand section of the tube 54 is cut off during the trace periods of the horizontal scanning wave so that a saw-tooth scanning voltage is produced across the charging condenser 60 and this saw-tooth scanning waveform is coupled through the resistor 61 to the control grid of the horizontal output tube 62. It will be noted that no peaking resistor is included in series with the charging condenser 60 so that the maximum supply voltage is available for the saw-tooth scanning voltage which is developed across the condenser 63. In this connection it will be understood that the coupling condenser 63 between the anode of the right hand section of the tube 54 and the resistor 61 is of relatively large capacity so that substantially all of the saw-tooth voltage is developed across the condenser 60.

The anode of the horizontal output tube 62 is connected through the coil 64 to a tap 65 on the horizontal output transformer indicated generally at 66. The transformer 66 is of the autotransformer type wherein the bottom end of the winding 67 is connected to the B+ supply and the horizontal scanning coils are connected across a portion of the winding 67 through the coupling condenser 68, a damping diode 69 being connected across a portion of the winding 67 and in series with the coils

70 and 71 and the condenser 72 to the B+ supply so as to provide a boost voltage across the condenser 72 which may be employed to provide increased plate supply voltage for any desired portion of the receiver, as will be readily understood by those skilled in the art. The upper end of the winding 67 is connected to the anode of a high voltage rectifier tube 80, the cathode of which is connected to the high voltage filter condenser 81 so as to provide a suitable accelerating anode voltage which is impressed upon the accelerating anode 24 of the picture tube 15.

In order to provide adequate peaking voltage for output tube 62 so that this tube is rendered completely nonconductive during the retrace intervals of the horizontal scanning wave while at the same time permitting an arrangement wherein a relatively low voltage B+ supply may be employed for this tube, the horizontal output transformer 66 is provided with an auxiliary winding 85, one end of which is connected to ground, and the cathode of the tube 62 is connected to a tap 86 on the winding 85. The upper end of the winding 85 is connected over the conductor 41 to the AFC circuit 20 so as to supply the above described retrace pulses for synchronization purposes. The winding 85 comprises a relatively small number of turns which are sufficient to develop pulses of approximately 80 volts peak amplitude across the entire winding 85, the tap 86 being approximately at the center of the winding 85 so that positive pulses of approximately 40 volts peak amplitude are impressed upon the cathode of the horizontal output tube 62 during the retrace periods of the horizontal scanning wave. More particularly, referring to Fig. 3, the positive pulses 90 are developed across the bottom portion of the winding 85 and are impressed upon the cathode of the horizontal output tube 62 so that the cathode voltage of this tube is increased positively by the voltage $V_k$ during the retrace intervals of the horizontal scanning wave. At the same time the saw-tooth scanning voltage 91 shown in Fig. 4 is applied to the control grid of the tube 62 so that a composite wave 92 shown in Fig. 5 is developed between the control grid and cathode of the horizontal output tube 62. It will be noted that the cathode pulses produce the relatively large negative going pulse portions 93 of the waveform 92 so that the control grid of the horizontal output tube is driven well beyond the anode current cut off point so that the tube 62 is rendered completely nonconductive during the retrace periods. As a result, the tube 62 constitutes substantially no load upon the horizontal output transformer 66 so that a substantially larger accelerating voltage can be produced across the filter condenser 81. Also, due to the fact that the coupling to the cathode of the tube 62 is regenerative an extremely sharp cut off of the current flowing in the tube 62 is produced so that the inductive voltage developed across the transformer 66 is thereby increased. In this connection it will be understood that the portion of the winding 85 included in the cathode circuit of the tube 62 is of sufficiently small number of turns that the turns ratio of the portion of the main winding 67 included between the anode of the tube 62 and the B+ supply relative to the auxiliary winding 85 is relatively large so that self oscillation within the output stage 22 is prevented. It will also be noted that during the off-pulse intervals a steady negative voltage is produced across the winding 85 of a value $-V_k$ (Fig. 3) so that the cathode of the tube 62 is held negative with respect to ground during the trace intervals of the scanning waveform with the result that the effective plate supply voltage for the tube 62 is increased by the amount $-V_k$. Accordingly, a larger scanning current may be caused to flow in the horizontal scanning coils 23 since the output tube 62 conducts more heavily during these periods when the cathode thereof is operated negatively with respect to ground. When a relatively low voltage plate supply of, for example, 160 volts, is employed, the increase in available voltage for the output tube 62 afforded by the auxiliary winding 85 represents a substantial increase in the maximum available current which may be drawn from the tube 62 and hence a substantial increase in both the high voltage for the picture tube 15 and the scanning current available for the coils 23. It will be noted that the output tube 62 presents a low cathode impedance across the winding 85 only during the latter portion of the trace intervals when a low steady state voltage is produced across the winding 85 so that the damping effect produced by the tube 62 on the transformer 66 is negligible. It will also be noted that the winding 85 is also employed to develop pulses for the AFC circuit 20 so that the cost and complexity of the receiver is not increased appreciably while providing the above described cathode cut off arrangement for the horizontal output tube 62.

In Fig. 2 there is illustrated an alternative embodiment of the present invention wherein a somewhat different form of automatic frequency control circuit is arranged to function with the above described horizontal output tube circuit. In the circuit of Fig. 2 circuit components corresponding to those described above in connection with Fig. 1 have been given the same reference numerals. Thus, referring to Fig. 2, the synchronizing pulses from the synchronizing separator 16 are coupled to a differentiating network including the series condenser 100 and the shunt resistor 101, so that the synchronizing pulses are differentiated to provide a waveform having a relatively steep sloped portion which crosses the zero axis thereof and may be employed as a reference voltage for the balanced discriminator circuit. The auxiliary winding 85 of the horizontal output transformer 66 is arranged to provide both positive and negative pulses for the balanced discriminator circuit. More particularly, the center tap 86 of the winding 85 is connected to ground and the top end of the winding 85 is coupled through the condenser 102 to the anode of the rectifier 103 while the bottom end of the winding 85 is coupled through the condenser 104 to the cathode of the rectifier 105, the differentiated synchronizing pulses being applied to the common cathode-anode connection of the rectifiers 103 and 105. A control voltage is thus developed across the output resistor 106 which is proportional to the phase relationship between the synchronizing pulses supplied from the separator 16 and the positive and negative pulses developed across the auxiliary winding 85, this control voltage being supplied to the control grid of the horizontal oscillator 21 as described in detail above in connection with Fig. 1. In the embodiment of Fig. 2 the cathode of the horizontal output tube 62 is connected to the upper end of the winding 85 so that positive pulses of approximately 40 volts amplitude are impressed upon the cathode of the tube 62 during the retrace intervals of the horizontal scanning wave. Accordingly, the cathode cut-off action described in detail above in connection with Fig. 1 is also provided in the arrangement shown in Fig. 2, it being understood that in other respects the horizontal output stage 22 functions in the manner identical to that described above in connection with Fig. 1.

While there have been described what are at present considered to be the preferred embodiments of the invention, it will be understood that various modifications may be made therein which are within the true spirit and scope of the invention as defined in the appended claims.

What is claimed as new and desired to be secured by Letters Patent of the United States is:

1. In a television receiver, a horizontal scan output tube, means for supplying a saw-tooth scanning wave to a control electrode of said tube, an inductive load circuit connected to the anode of said tube, means including a horizontal scanning yoke for deriving from said inductive load circuit a saw-tooth scanning current, an auxiliary winding inductively coupled to said inductive load circuit, and means connecting said winding in the cathode circuit of said tube in the proper polarity to cut off said tube during the retrace intervals of said scanning wave.

2. In a television receiver, a horizontal scan output tube, means for supplying a saw-tooth scanning wave to a control electrode of said tube, an inductive load circuit connected to the anode of said tube, means including a horizontal scanning yoke for deriving from said inductive load circuit a saw-tooth scanning current, an auxiliary winding inductively coupled to said inductive load circuit to develop a pulse waveform thereacross during the retrace intervals of said scanning wave, and means connecting said winding in the cathode circuit of said tube in the proper polarity to cut off said tube during the retrace intervals of said scanning wave and increase the effective anode supply voltage for said tube during the trace intervals of said scanning wave.

3. In a television receiver, a horizontal scan output tube, means for supplying a saw-tooth scanning wave to a control electrode of said tube, an inductive load circuit connected to the anode of said tube, means for deriving a saw-tooth scanning current from said inductive load circuit, means for deriving from said inductive load circuit a voltage proportional to the rate of change of current through said inductive load circuit, and means for impressing said voltage on the cathode of said tube in a proper polarity to drive said tube beyond cut-off during the retrace intervals of said scanning wave.

4. In a television receiver, a horizontal output stage including a scan output tube, means for supplying a saw-tooth scanning wave to a control electrode of said tube, a horizontal output transformer having a main winding connected to the anode of said tube, means for deriving a saw-tooth scanning current from said horizontal output transformer, an auxiliary winding on said transformer, and means connecting said auxiliary winding in the cathode circuit of said tube so that positive pulses are impressed upon the cathode of said tube during the retrace intervals of said scanning wave said positive pulses being of sufficient amplitude completely to cut off said tube during said retrace intervals, the turns ratio of said main winding to said auxiliary winding being sufficiently large to prevent self-oscillation within said output stage.

5. In a television receiver, a horizontal output stage including a power output tube, means for supplying a saw-tooth scanning wave to a control electrode of said tube, a horizontal output transformer having a main winding connected to the anode of said tube, means for deriving a saw-tooth scanning current from said transformer, means for deriving an accelerating anode voltage from said transformer, an auxiliary winding on said transformer, means connecting said auxiliary winding in the cathode circuit of said tube to completely cut off said tube during substantially the entire retrace interval of each cycle of said scanning wave, whereby a relatively light load is placed on said transformer by said tube during said retrace intervals and a relatively large accelerating anode voltage is derived therefrom.

6. In a television receiver, a horizontal scanning oscillator, an output stage including a power output tube, a horizontal output transformer connected to the anode of said tube, means for deriving a saw-tooth scanning wave from said oscillator and impressing the same on a control electrode of said tube, means for deriving a corresponding saw-tooth current from said transformer, a source of synchronizing pulses, an auxiliary winding on said transformer for developing pulses thereacross during the retrace intervals of said scanning wave, means connecting said winding in the cathode circuit of said output tube in the correct polarity to cause said pulses to drive said tube beyond anode current cut-off during said retrace intervals, and an automatic frequency control circuit jointly controlled by synchronizing pulses from said source and the pulses produced across said auxiliary winding for maintaining said scanning oscillator in synchronism with said synchronizing pulses.

7. In a television receiver, a horizontal scanning oscillator, an output stage including a power output tube, a horizontal output transformer connected to the anode of said tube, means for deriving a saw-tooth scanning wave from said oscillator and impressing the same on a control electrode of said tube, means for deriving a corresponding saw-tooth current from said transformer, a source of synchronizing pulses, an auxiliary winding on said transformer for developing pulses thereacross during the retrace intervals of said scanning wave, means connecting said winding in the cathode circuit of said output tube in the correct polarity to cause said pulses to drive said tube beyond anode current cut-off during said retrace intervals, an automatic frequency controlling discriminator circuit, means for impressing synchronizing pulses from said source on said discriminator circuit, means for impressing pulses developed across said auxiliary winding on said discriminator circuit, means for deriving a control voltage from said discriminator circuit proportional to the phase relationship of said synchronizing pulses and said scanning wave, and means for impressing said control voltage on said scanning oscillator to control the frequency thereof.

8. In a television receiver, a horizontal scanning oscillator, an output stage including a power output tube, a horizontal output transformer connected to the anode of said tube, means for deriving a saw-tooth scanning wave from said oscillator and impressing the same on a control electrode of said tube, means for deriving a corresponding saw-tooth current from said transformer, a source of synchronizing pulses, an auxiliary winding on said transformer having a center tap connected to a point of reference potential so that pulses of opposite polarity are produced across the halves of said winding during the retrace intervals of said scanning wave, means connecting the half of said auxiliary winding across which positive pulses are developed in the cathode circuit of said output tube, thereby to drive said tube beyond anode current cut-off during said retrace intervals, an automatic frequency control circuit, means for differentiating synchronizing pulses from said source and impressing said differentiated synchronizing pulses on said frequency control circuit, means for impressing positive and negative pulses developed across said auxiliary winding on said frequency control circuit, means for deriving from said control circuit a control voltage proportional to the phase relationship between said synchronizing pulses and said scanning wave, and means for impressing said control voltage on said scanning oscillator to control the frequency thereof.

9. In a television receiver, a horizontal scanning oscillator, an output stage including a power output tube, a horizontal output transformer connected to the anode of said tube, means for deriving a saw-tooth scanning wave from said oscillator and impressing the same on a control electrode of said tube, means for deriving a corresponding saw-tooth current from said transformer, a source of synchronizing pulses, an auxiliary winding on said transformer having a center tap connected to a point of reference potential so that pulses of opposite polarity are produced across the halves of said winding during the retrace intervals of said scanning wave, means connecting the half of said auxiliary winding across which positive pulses are developed in the cathode circuit of said output tube, thereby to drive said tube beyond anode current cut-off during said retrace intervals, a balanced discriminator circuit, means for deriving from said synchronizing pulses a waveform having a relatively steep sloped portion which crosses the zero axis thereof, means for impressing said waveform on said discriminator circuit, means for impressing positive and negative pulses developed across said auxiliary winding on said discriminator circuit, and means connecting the output of said discriminator circuit to said scanning oscillator to control the frequency thereof.

References Cited in the file of this patent

UNITED STATES PATENTS

| | | |
|---|---|---|
| 2,482,150 | Bocciarelli | Sept. 20, 1949 |
| 2,498,007 | Schade | Feb. 21, 1950 |

OTHER REFERENCES

Rider's Television Manual, vol. 7, GE TV, pages 7–20 (Model 815), copyrighted 1951.